United States Patent
Huang et al.

(10) Patent No.: US 7,782,728 B2
(45) Date of Patent: Aug. 24, 2010

(54) DEVICE FOR LAYER-JUMPING CONTROL OF OPTICAL DISC DEVICES AND RELATED METHOD

(75) Inventors: Chang-Cheng Huang, Taipei County (TW); Chun-Ta Chen, Taichung (TW)

(73) Assignee: Princeton Technology Corporation, Taipei County (TW)

( * ) Notice: Subject to any disclaimer, the term of this patent is extended or adjusted under 35 U.S.C. 154(b) by 731 days.

(21) Appl. No.: 11/730,869

(22) Filed: Apr. 4, 2007

(65) Prior Publication Data

US 2008/0112280 A1 May 15, 2008

(30) Foreign Application Priority Data

Nov. 14, 2006 (TW) .............................. 95142164 A

(51) Int. Cl.
*G11B 11/00* (2006.01)
(52) U.S. Cl. ...................................... 369/53.28; 369/94
(58) Field of Classification Search ........................ None
See application file for complete search history.

(56) References Cited

U.S. PATENT DOCUMENTS

| | | | | |
|---|---|---|---|---|
| 6,246,646 B1 * | 6/2001 | Abe et al. | ................. | 369/44.27 |
| 2001/0008506 A1 * | 7/2001 | Takeya et al. | ............ | 369/44.29 |
| 2001/0024408 A1 * | 9/2001 | Kobayashi | ............... | 369/44.27 |
| 2002/0060960 A1 * | 5/2002 | Kobayashi | ............... | 369/44.27 |
| 2002/0136103 A1 * | 9/2002 | Kobayashi | ................... | 369/43 |
| 2002/0145101 A1 * | 10/2002 | Nishio et al. | ............. | 250/201.5 |
| 2002/0159342 A1 * | 10/2002 | Ogasawara et al. | ...... | 369/44.23 |
| 2003/0012093 A1 * | 1/2003 | Tada et al. | ................ | 369/44.27 |
| 2003/0165092 A1 * | 9/2003 | Song et al. | ................ | 369/44.29 |
| 2005/0254360 A1 * | 11/2005 | Sameshima et al. | ...... | 369/44.23 |
| 2006/0285452 A1 * | 12/2006 | Nakane | ................... | 369/44.29 |
| 2007/0076540 A1 * | 4/2007 | Chao et al. | ............... | 369/44.16 |
| 2008/0037390 A1 * | 2/2008 | Tateishi et al. | ........... | 369/44.29 |

* cited by examiner

*Primary Examiner*—Paul Huber
(74) *Attorney, Agent, or Firm*—Muncy, Geissler, Olds & Lowe, PLLC

(57) ABSTRACT

A layer-jumping control device and method for an optical disc device includes a calculator, a controller, and a driver. The calculator is configured to receive an error-focusing signal, and to determine a peak and a trough of the error-focusing signal. The controller, coupled to the calculator, is configured to process the error-focusing signal to generate a control-focusing signal. The driver, coupled to the controller, is configured to convert the control-focusing signal to a control-driving signal. The device further includes a counter coupled to the calculator, and enables the layer jump when the counter reaches a predetermined value.

18 Claims, 6 Drawing Sheets

DEVICE FOR LAYER-JUMPING CONTROL OF OPTICAL DISC DEVICES AND RELATED METHOD

BACKGROUND

The invention relates to a device and a method for layer-jumping control in optical disc devices, and more particularly to a device and a method for layer-jumping control of dual-layer DVDs.

Current commercial optical discs comprise single-layer and dual-layer discs. Single-layer discs, such as CD, VCD, DVD5, DVD10, and others, are recorded in a single-layer structure, while dual-layer discs, such as DVD9, DVD18, SACD (Super Audio Compact Disc), and others, are recorded in a dual-layer structure.

In a single-layer disc, an optical pickup head can horizontally read data recorded in different storage zones thereof due to the single-layer structure. A dual-layer disc has an upper layer (the $0^{th}$ layer) and a lower layer (the $1^{st}$ layer). When a dual-layer disc is read, the optical pickup head is required to move vertically between and horizontally on the upper and lower layers, thus, the focus of the optical pickup head can jump from the $0^{th}$ layer to the $1^{st}$ layer or the $1^{st}$ layer to the $0^{th}$ layer to read data recorded on the $0^{th}$ or the $1^{st}$ layer.

During disc rotation for reading in a disc device, however, the disc may move up and down, which is referred to as the wobble effect. The wobble effect further causes the optical pickup head to imprecisely jump between the $0^{th}$ layer and the $1^{st}$ layer, resulting in read failure.

SUMMARY

To compensate for the wobble effect, the invention provides a control device and method for layer jumping in optical disc devices.

The invention provides a control device and method for layer jumping in optical disc devices. A calculator is utilized to analyze the wobble wave to determine a predetermined range or a predetermined time. A time, substantially closing to the time when a disc sways close to the horizontal level, is determined to make a layer jump corresponding to the relationship between the wobble wave and the predetermined range or time.

One embodiment of the invention provides a control device for layer-jumping in optical disc devices, comprising a calculator, a controller, and a driver. The calculator receives, and determines, the peak and trough of an error-focusing signal. The controller, coupled to the calculator, processes the error-focusing signal to generate a control-focusing signal. The driver, coupled to the controller, converts the control-focusing signal to generate a control-driving signal.

Another embodiment of the invention provides a control method for layer jumping in optical disc devices, comprising three steps. An error-focusing signal is received and the peak and the trough of the error-focusing signal are determined. The error-focusing signal is processed to generate a control-focusing signal. The control-focusing signal is converted to generate a control-driving signal.

DETAILED DESCRIPTION

The invention can be more fully understood with reference to the detailed description and accompanying drawings.

Figure 1A:
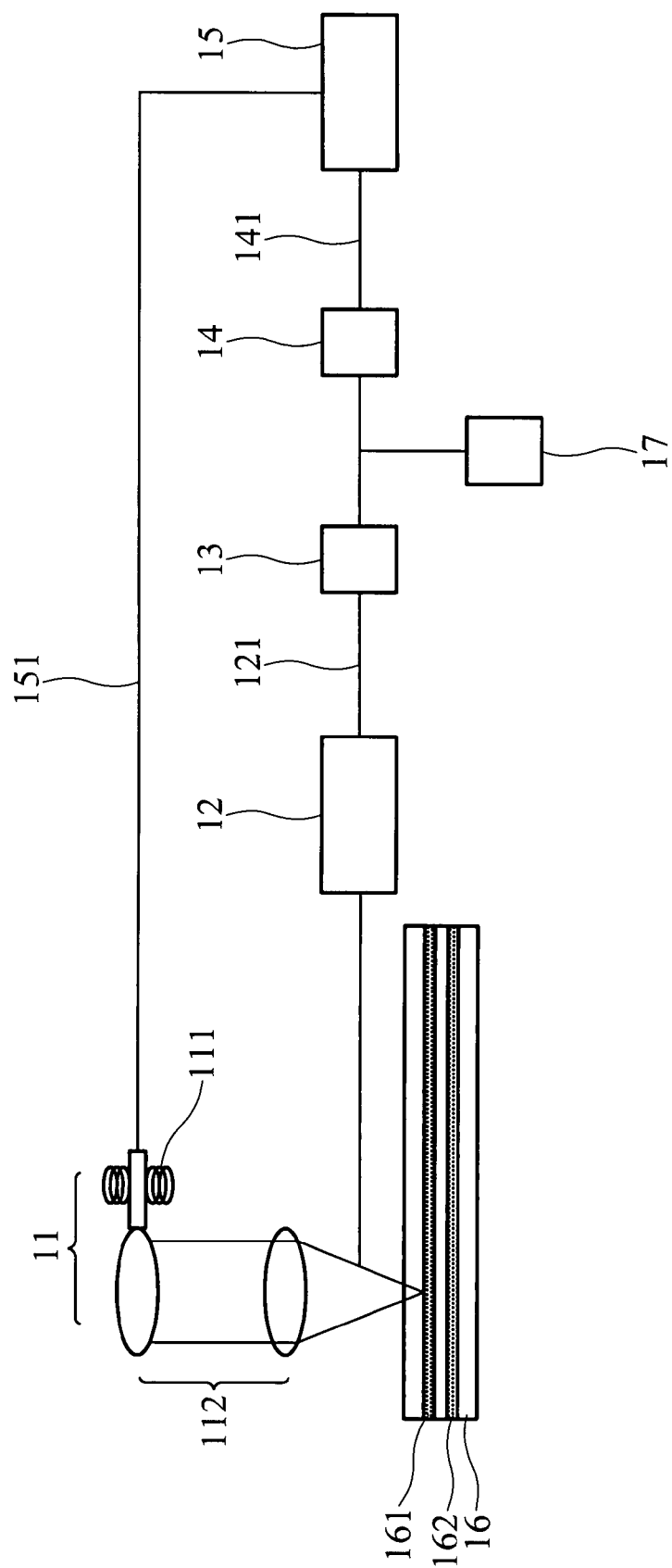
FIG. 1(a) shows a block diagram of a layer-jumping control device of an optical disc device, according to an embodiment of the invention.

FIG. 1(a) is a block diagram of a control device for layer-jumping in optical disc devices, of an embodiment of the invention. As shown in FIG. 1(a), the control device 10 comprises an optical pickup head 11, a pre-stage amplifier 12, a calculator 13, a controller 14, and a driver 15. Optical pickup head 11 has a VCM (Voice Coil Motor) 111 and a lens 112; for driving lens 112 to move vertically, corresponding to a control-driving signal 151 generated from driver 15 through VCM 111, enabling optical pickup head 11 to a layer jump between the $0^{th}$ layer 161 and the $1^{st}$ layer 162 of disc 16. Additionally, control device 10 is inside a DVD player (not shown), but the invention is not limited to this.

Pre-stage amplifier 12, coupled to optical pickup head 11, can generate an error-focusing signal 121 corresponding to the result of reading disc 16. Calculator 13, coupled to pre-stage amplifier 12, is configured to receive the error-focusing signal 121 for analysis to determine a middle value of the error-focusing signal 121 according to its peak and trough. Additionally, calculator 13 analyzes the peak, the trough, and the middle values of the error-focusing signal 121 for determining whether optical pickup head 11 jumps layers. Controller 14, coupled to calculator 13, is configured to process the error-focusing signal 121 to generate a control-focusing signal 141. Driver 15, coupled to controller 14, is configured to convert the control-focusing signal to a control-driving signal 151, and to control the VCM 111 of optical pickup head 11 to drive lens 112 by the control-driving signal 151 for jumping layers between the $0^{th}$ layer 161 and the $1^{st}$ layer 162 of disc 16.

Figure 1B:
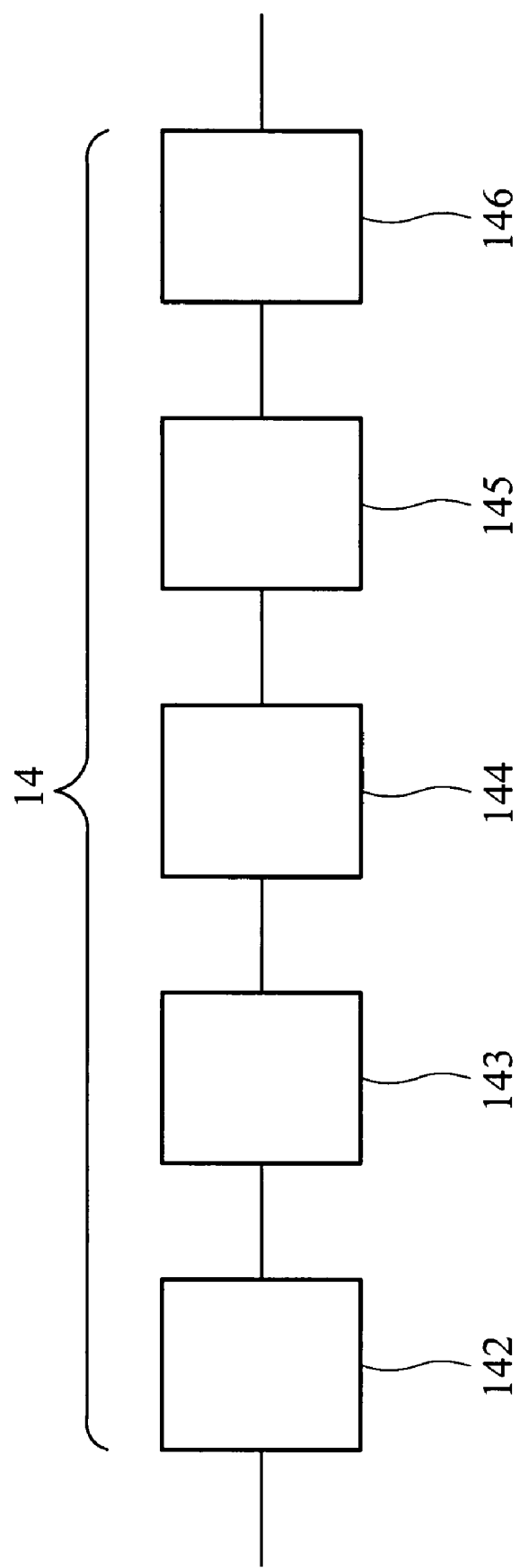
FIG. 1(b) shows a structure of the controller in FIG. 1(a)

In one embodiment, controller 14 can comprise three low-pass filters (LPFs) 143, 144, 146, and two lags 142, 145 (as shown in FIG. 1(b)), which are cascaded in the following order: lag 142, LPFs 143 and 144, lag 145, and LPF 146. Controller 14 is not to be restricted to the described order. Using LPFs 143, 144, and 146 can provide more configurable parameters for the control-focusing signal 141 generated from controller 14, and generate a more complete waveform, hence it can apply to more applications in comparison to using one LPF only. The described three LPFs provided in this embodiment are provided as an example, and the number of LPFs is not limited to three.

Figure 2:
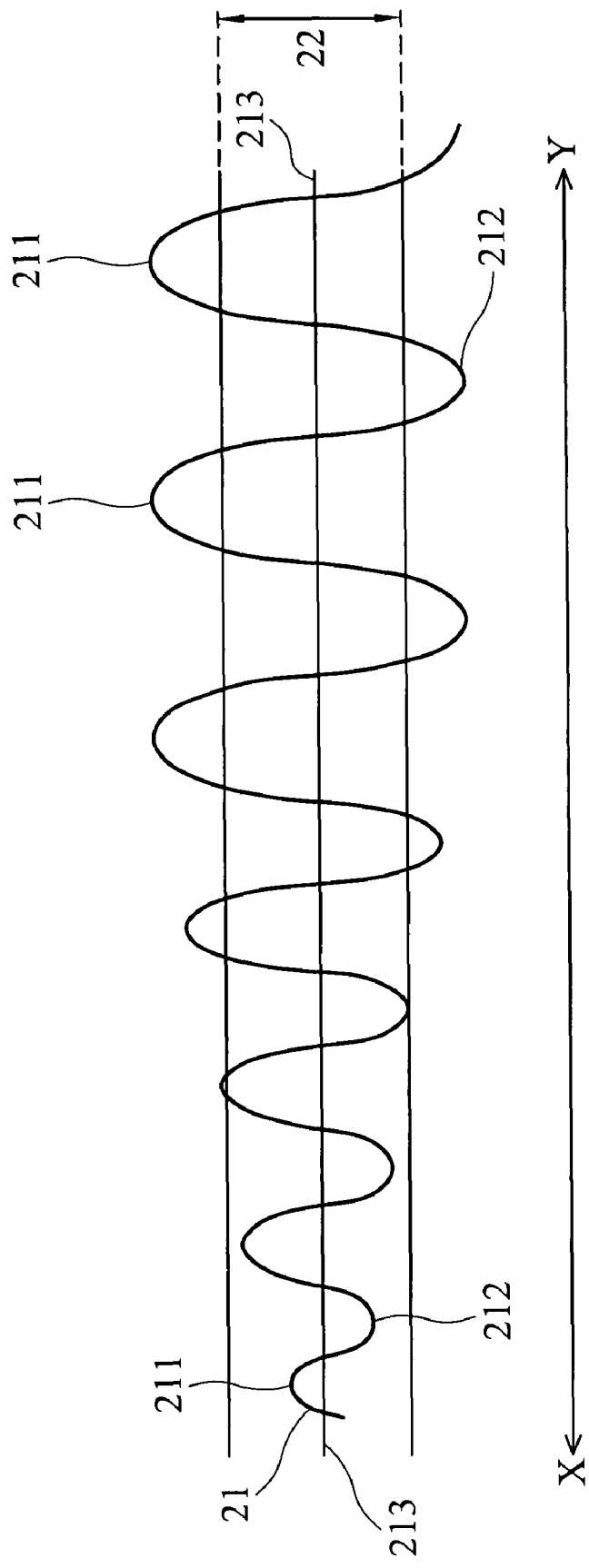
FIG. 2 shows a signal processing according to an embodiment of the invention.

FIG. 2 is an explanatory example for signal processing of the invention. Wobble wave 21 is a signal induced from the rotation of a disc, and the amplitude of wobble wave 21 becomes larger from terminal X to Y along the X-Y axis. Terminal X is the wobble wave of the inner part of disc 16, and terminal Y is the wobble wave of the outer part of disc 16. The inner wobble wave is smaller because the inner part of disc 16 is near the rotation axis, while the outer wobble wave is larger because the outer part of disc 16 is far from the rotation axis. Calculator 13 can calculate the middle value 213 of wobble wave 21 according to the peak 211 and the trough 212 of wobble wave 21, and because it is fixed throughout, middle value 213 will not vary along the X-Y axis. Calculator 13 can determine a predetermined range 22 around middle value 213, and the distance between the maximum and minimum of the predetermined range 22 and the middle value 213 is fixed, as a result, the predetermined range 22 does not vary with the X-Y axis.

When controller 14 controls optical pickup head 11 to execute a layer jump, it will determine whether wobble wave 21 is within the predetermined range 22. If wobble wave 21 is within the predetermined range 22, controller 14 enables optical pickup head 11 to make a layer jump; otherwise, controller 14 will suspend the layer jump unless wobble wave 21 enters the predetermined range 22. Consequently, utilizing controller 14 can decrease wobble effect induced errors by controlling optical pickup head 11 to execute the layer jump when wobble wave 21 enters the predetermined range 22, and increases layer jumping stability. In one embodiment, the predetermined range 22 can be set to between half the peak and half the trough, but it is not restricted to this range.

Referring back to FIG. 1, in another embodiment, the control device 10 can further comprise a counter 17, coupled to calculator 13 and controller 14. Counter 17 starts counting when the error-focusing signal 121 reaches its peak and trough respectively until reaching a predetermined time.

Figure 3:
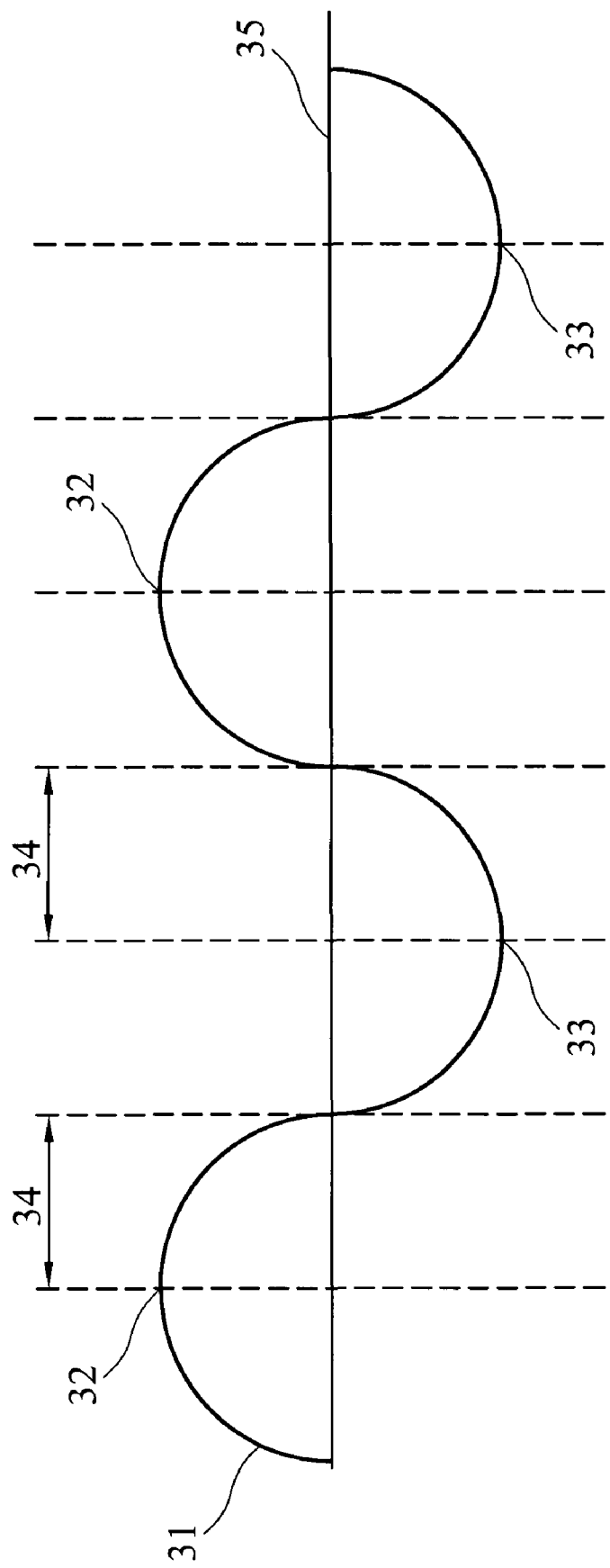
FIG. 3 shows a signal processing according to another embodiment of the invention.

FIG. 3 shows another explanatory example for signal processing of the invention. Wobble wave 31 induced from the rotation of a disc has a peak 32 and a trough 33, and the time of two adjacent peaks 32 or two adjacent troughs 33 is the duration of wobble wave 31. As long as the rotation speed of disc 16 remains the same, the duration of wobble wave 31 is fixed.

While controller 14 controls optical pickup head 11 to execute a layer jump, counter 17 can begin counting when calculator 13 detects a peak or a trough of wobble wave 31. When the counter 17 reaches a predetermined time 34, controller 14 enables optical pickup head 11 to execute the layer jump. Because of the fixed duration of wobble wave 31, wobble wave 31 is near the middle value 35 after a certain period later than the appearance of the peak 32 or trough 33. Executing the layer jump at a time close to the middle value 35 can reduce layer jump failure due to the wobble effect, as well as increase layer jump stability. More specifically, the predetermined time 34 can be set to the period between the time of the appearance of the peak 32 or trough 33 and the time close to the middle value 35 of wobble wave 31, thus, optical pickup head 11 can jump layers when wobble wave 31 is near the middle value 35. As a result, the layer jump can be executed at the time when disc 16 is near horizontal level, and optical pickup head 11 can move more precisely to prevent layer jump failure due to the wobble effect thus increasing layer jump stability. In one embodiment, the predetermined time 34 can be a quarter duration of wobble wave 31, but is not restricted to this.

Figure 4:
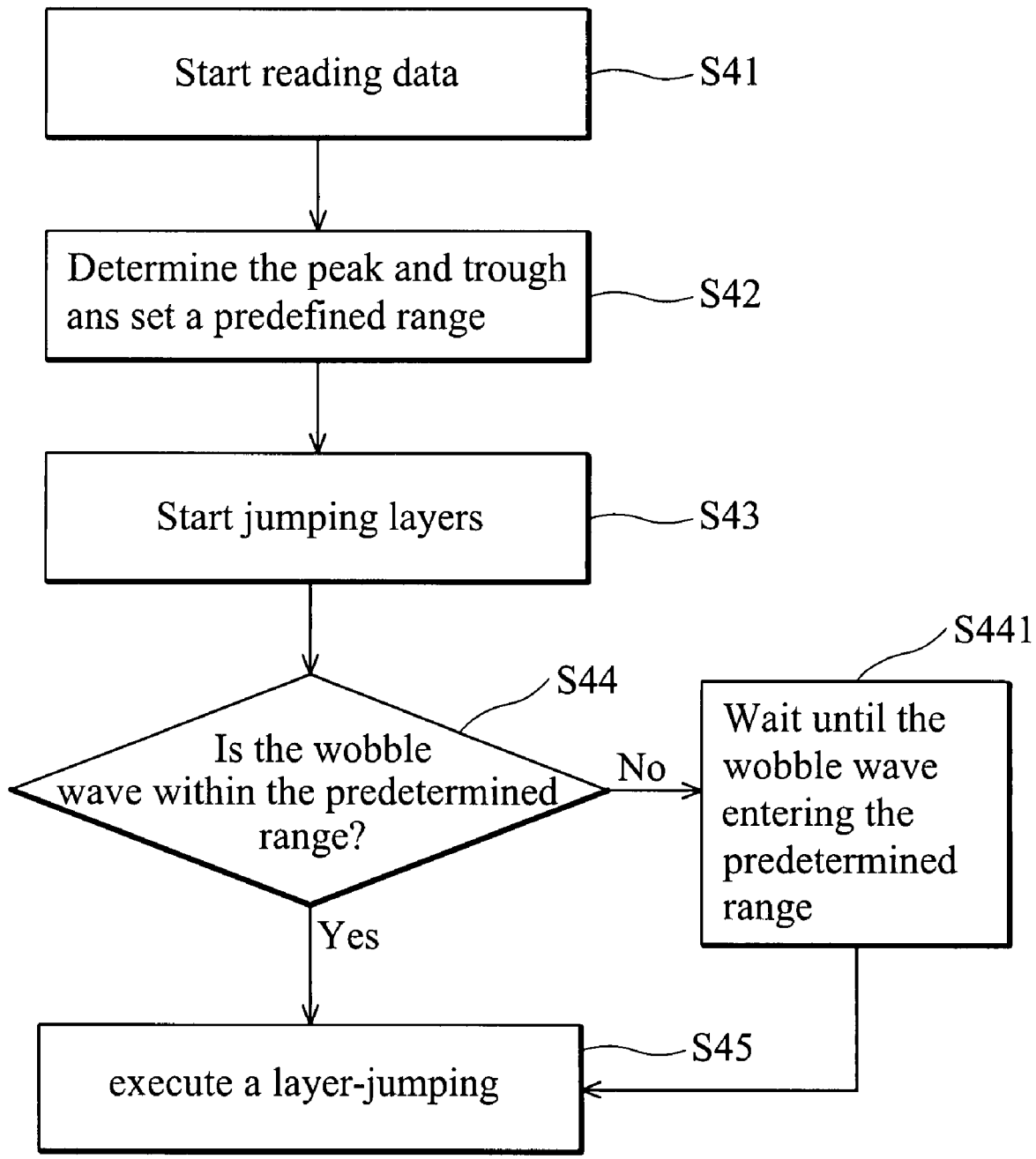
FIG. 4 shows a flowchart of a embodiment of the invention.

FIG. 4 is a flow chart of an embodiment of the invention. As shown in FIG. 4, after disc 16 is placed in an optical disc device, controller 14 begins to control the reading of optical pickup head 11 (S41). Calculator 13 starts analyzing an error-focusing signal 121 generated from pre-stage amplifier 12 to determine the peak 211 and trough 212 of wobble wave 21, and determine a middle value 213 and a predetermined range 22 corresponding to the peak 211 and trough 212 (S42). At the beginning of the layer jump of optical pickup head 11 (S43), controller 14 examines whether wobble wave 21 is within the predetermined range 22 determined by calculator 13 (S44). If wobble wave 21 is within the predetermined range 22, optical pickup head 11 will execute the layer jump (S45); if wobble wave 21 is outside the predetermined range 22, optical pickup head 11 will execute the layer jump (S45) after wobble wave 21 enters the predetermined range 22 (S441). Because the amplitude of wobble wave 21 becomes larger from the inner part to the outer part of disc 16, the amplitude of wobble wave 21 at the inner part may be smaller than the predetermined range 22. Thus, the layer jump can be executed successfully. The amplitude of wobble wave 21 at the outer part, however, may be larger than the predetermined range 22, easily exceeding the predetermined range 22 at the appearance of peak 211 and trough 212, thus, optical pickup head 11 must suspend the layer jump until the wobble wave 21 enters the predetermined range 22.

Figure 5:
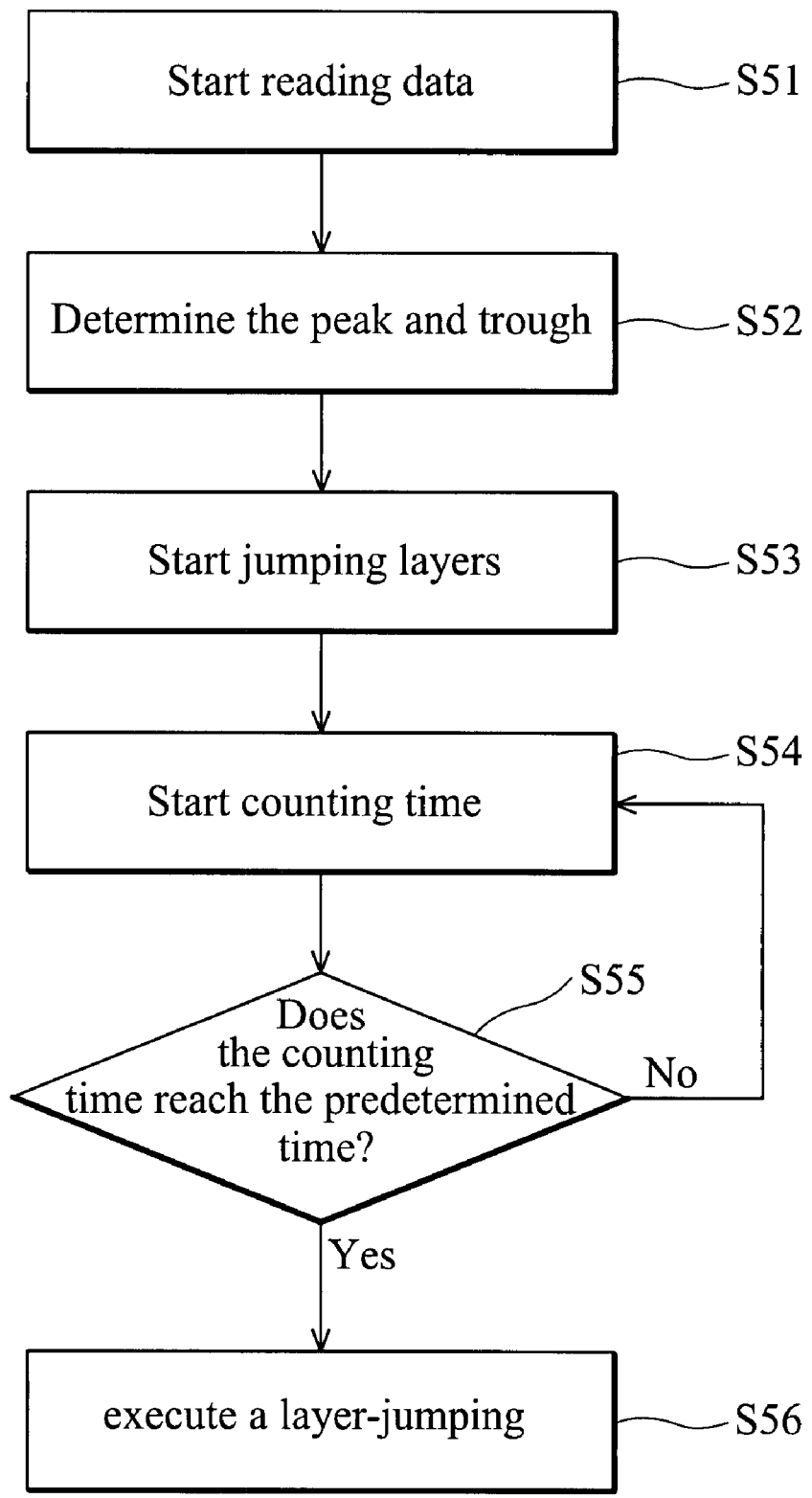
FIG. 5 shows a flowchart of another embodiment of the invention.

FIG. 5 is a flow chart of another embodiment according to the invention. As shown in FIG. 5, just prior to reading data immediately after disc 16 is placed in an optical disc device (S51), the peak 32 and trough 33 of wobble wave 31 are determined by calculator 13 (S52). When controller 14 is about to enable the layer jump of optical pickup head 11 (S53), counter 17 will start counting time at the most recent appearance of the peak 32 or trough 33 (S54), and determine whether the counting time has reached the predetermined time 34 (S55). If the counting time has not reached the predetermined time 34, counter 17 will continue counting; if the counting time has reached the predetermined time 34, controller 14 enables optical pickup head 11 to execute the layer jump (S56). This is merely an example for the purposes of illustration and the invention is not limited to the foregoing description.

As shown, in some embodiments according of the invention, a calculator is utilized to analyze a wobble wave, set a predetermined range or predetermined time by the wobble wave, and determine the time at which a wobbling disc is near the horizontal level and then executing a layer jump. Thus, the possibility of layer jump failure due to the wobble effect can be reduced, and the stability and success of layer jumping of the optical pickup head can be increased.

It is also understood that the examples and embodiments described herein are for illustrative purposes only and not to restrict the scope of the invention. The invention may be varied or modified by those skilled in the art without departing from the spirit and the scope of the invention. Accordingly, it is appropriate that the appended claims be construed broadly and in a manner consistent with the scope of the invention, as set forth in the following claims.

What is claimed is:

1. A layer-jumping control device for an optical disc device, comprising:
   a calculator, configured to receive an error-focusing signal, and to determine a peak and a trough of the error-focusing signal;
   a controller, coupled to the calculator, configured to process the error-focusing signal to generate a control-focusing signal;
   a driver, coupled to the controller, configured to convert the control-focusing signal to a control-driving signal; and
   a counter, coupled to the calculator, starting to count time when the error-focusing signal reaches the peak or the trough.

2. The layer-jumping control device of claim 1, further comprising a pre-stage amplifier configured to generate the error-focusing signal.

3. The layer-jumping control device of claim 1, further comprising an optical pickup head, comprising a lens and a VCM (Voice Coil Motor), for driving the VCM corresponding to the control-driving signal to move the lens vertically.

4. The layer-jumping control device of claim 1, wherein the calculator determines a middle value of the error-focusing signal by the peak and the trough of the error-focusing signal.

5. The layer-jumping control device of claim 4, wherein the calculator determines a predetermined range of the error-focusing signal by the middle value.

6. The layer-jumping control device of claim 5, wherein the predetermined range is between a half value of the peak and a half value of the trough.

7. The layer-jumping control device of claim 6, wherein the controller enables a layer jump of the layer-jumping control device when the error-focusing signal falls in the predetermined range.

8. The layer-jumping control device of claim 1, wherein the controller further comprises a plurality of lags and a plurality of LPFs (Low-Pass Filters).

9. The layer-jumping control device of claim 8, wherein the controller is a cascade of a lag, two LPFs, a lag, and an LPF in order.

10. The layer-jumping control device of claim 1, wherein the controller enables the layer jump of the layer-jumping control device when the counter reaches a predetermined value.

11. The layer-jumping control device of claim 1, wherein the optical disc device is a DVD device.

12. A method for layer-jumping control of an optical disc device, controlling a layer jump of the optical disc device, comprising:
   (a) receiving an error-focusing signal, and determining a peak and a trough of the error-focusing signal;
   (b) processing the error-focusing signal to generate a control-focusing signal; and
   (c) converting the control-focusing signal to a control-driving signal;
   wherein step (a) further comprises:
   beginning to count when the error-focusing signal reaches the peak or the trough.

13. The method of claim 12, wherein the step (a) further comprises:
   (a1) determining a middle value of the error-focusing signal by the peak and the trough.

14. The method of claim 13, wherein the step (a) further comprises:
   (a2) determining a predetermined range of the error-focusing signal by the middle value.

15. The method of claim 14, wherein the predetermined range is between a half value of the peak and a half value of the trough.

16. The method of claim 14, further comprising a step of starting the layer jump when the error-focusing signal falls in the predetermined range.

17. The method of claim 12, further comprising a step of beginning the layer jump when the counting time has reached a predetermined time.

18. The method of claim 12, wherein the optical disc device is a DVD device.

* * * * *